United States Patent [19]

Kasuga et al.

[11] Patent Number: 4,916,024

[45] Date of Patent: Apr. 10, 1990

[54] MAGNETIC RECORDING MEDIUM

[75] Inventors: Akira Kasuga; Masaaki Fujiyama, both of Kanagawa, Japan

[73] Assignee: Fuji Photo Film Co., Ltd., Kanagawa, Japan

[21] Appl. No.: 390,503

[22] Filed: Aug. 1, 1989

Related U.S. Application Data

[63] Continuation of Ser. No. 25,693, Mar. 13, 1987, abandoned.

[30] Foreign Application Priority Data

Mar. 13, 1986 [JP] Japan .................................. 61-53567

[51] Int. Cl.$^4$ ............................................. G11B 5/708
[52] U.S. Cl. .................................... 428/323; 427/131; 428/329; 428/336; 428/694; 428/900
[58] Field of Search ............... 428/323, 329, 336, 694, 428/900; 427/131

[56] References Cited

U.S. PATENT DOCUMENTS

| | | | |
|---|---|---|---|
| 4,091,158 | 5/1978 | Kasuga et al. | 427/131 |
| 4,265,931 | 5/1981 | Tamai et al. | 427/131 |
| 4,511,617 | 4/1985 | Hideyama et al. | 427/131 |
| 4,617,226 | 10/1986 | Yamaguchi et al. | 427/131 |
| 4,643,941 | 2/1987 | Miyoshi et al. | 427/131 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a non-magnetic support having provided thereon an intermediate layer comprising carbon black, a binder and ferromagnetic particles in a weight ratio of from 5% to 25% based on the carbon black; and a magnetic layer provided on said intermediate layer, wherein said magnetic layer comprises ferromagnetic particles and a binder.

8 Claims, No Drawings

MAGNETIC RECORDING MEDIUM

This is a Continuation of application Ser. No. 07/025,693, filed 3/13/87, now abandoned.

FIELD OF THE INVENTION

The present invention relates to a magnetic recording medium, and more particularly it relates to a magnetic recording medium having an improved intermediate layer between the support and the magnetic layer thereof.

BACKGROUND OF THE INVENTION

In the past, as a magnetic recording medium for audio recording, video recording, information recording and the like, a magnetic recording medium comprising a non-magnetic support having provided thereon a magnetic layer containing ferromagnetic particles such as ferromagnetic iron oxide, cobalt-containing iron oxide, chromium dioxide, ferromagnetic alloy particles and the like has been mainly used. The above-described magnetic layer has high surface electric resistivity, and therefore, it is easily charged. As a result, noise occurs upon recording and playback. In addition, dust and contaminants easily attach on the surface, which causes drop out.

In general, carbon black is dispersed in a magnetic layer in order to prevent the magnetic layer from charging. However, due to the presence of carbon black, the packing density of the ferromagnetic particles in the magnetic layer decreases. As a result, the sensitivity and outputs decrease. In addition, due to poor the dispersibility of carbon black, the surface property of the magnetic layer deteriorates.

In order to solve the above problems, it is proposed, for example, in Japanese Patent Application (OPI) NO. 55433/1980 (the term "OPI" as used herein means an "unexamined published application".) that an electro-conductive layer (hereinafter referred to as an "intermediate layer") having dispersed therein carbon black be provided between a support and a magnetic layer. In accordance with the above method, the packing density of the ferromagnetic particles in a magnetic layer can be improved, but the dispersibility of the carbon black is insufficient, the surface property of the intermediate layer is poor and when a magnetic layer is provided on the intermediate layer, the electromagnetic properties such as sensitivity S/N and so on, are insufficient due to the poor surface property.

SUMMARY OF THE INVENTION

An object of the present invention is to provide a magnetic recording medium having an intermediate layer containing carbon black with improved dispersibility.

Another object of the present invention is to provide a magnetic recording medium having excellent electromagnetic properties such as sensitivity, S/N and so on and having an excellent charge preventing effect.

DETAILED DESCRIPTION OF THE INVENTION

It has been found in the present invention that the above-described objects can be met by employing an intermediate layer comprising carbon black, a binder and ferromagnetic particles in a weight of from 5 to 25% based on the carbon black.

That is, the present invention relates to a magnetic recording medium comprising a non-magnetic support having provided thereon an intermediate layer containing carbon black, a binder and ferromagnetic particles in a weight ratio of from 5% to 25% based on the carbon black; and a magnetic layer provided on said intermediate layer, wherein said magnetic layer comprising ferromagnetic particles and a binder. The present invention is illustrated in more detail as follows.

The non-magnetic supports used in the present invention are not particularly limited, and those conventionally used can be employed. Materials used for forming a non-magnetic support are, for example, various synthetic resin films of polyethylene therephthalate (PET), polypropylene, polycarbonate, polyethylene naphthalate, polyamide, polyamide imide, polyimide and so on, and metal foils of aluminum foil, stainless foil and so on. The thickness of the non-magnetic supports is not particularly limited, and is generally from 3 to 50 μm, preferably from 5 to 30 μm.

The carbon black used in the intermediate layer of the present invention is not particularly limited, and carbon black of M.T. (Medium Thermal), F.T. (Fine Thermal) as classified in the carbon black industry and commercially available carbon black corresponding to M.T. or F.T. of furnace carbon can also be used. The average particle size of the carbon black is preferably from 20 mμ to 1000 mμ. The carbon black is used in an amount of from 50 to 200 wt% based on a binder.

The ferromagnetic particles incorporated into the intermediate layer include for example, $\gamma$-$Fe_2O_3$, Co-$\gamma$-$Fe_2O_3$, Fe-Co type or Fe-Co-Ni type alloy magnetic particles; $CrO_2$, Ba-Fe and the like. These ferromagnetic particles can also be used in the magnetic layer. It is preferred that the same ferromagnetic particles as those used in the magnetic layer are used in the intermediate layer. The reason for that is, when a different type of ferromagnetic particles is used, the Hc (coercive force), the δs and the particle size of the ferromagnetic particles of each must be adjusted to be equal, and particularly when the Hc and the particle size are different, the two poles distribution of Hc and the noise level are increased, which is unfavorable for increasing the sensitivity and S/N. Accordingly, when different types of magnetic particles are used, the particle characteristics of the ferromagnetic particles used in the magnetic layer should be as similar as possible to those used in the intermediate layer.

The content of ferromagnetic particles is from 5% to 25 wt%, particularly from 10% to 20 wt% based on carbon black in the intermediate layer. When the content is less than 5%, the dispersibility of carbon black is deteriorated, and when the content is greater than 25%, the electric resistivity of the intermediate layer increases, whereby the charge-preventing effect decreases.

The binders used in the intermediate layer of the present invention are thermoplastic resins, thermosetting resin, reactive type resins and mixtures thereof. Those binders mainly containing polyurethane or polyurethane itself are preferred. The intermediate layer has a thickness of from 0.2 to 3.0 μm, preferably from 0.5 to 2.0 μm.

The thermoplastic resins used in the present invention are those having a softening point of 150° C. or lower, an average molecular weight of 10,000 to 200,000 and a degree of polymerization of from about 200 to 2,000 such as a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, polyvinyl fluoride, a copolymer of vinylidene chloride and acrylonitrile, a copolymer of butadiene and acrylonitrile, a polyamide resin, polyvinyl butyral, cellulose derivatives (such as cellulose acetate butyrate, cellulose diacetate, cellulose triacetate, cellulose propionate, nitocellulose and the like), a copolymer of styrene and butadiene, a polyester resin, a copolymer of chlorovinyl ether and acrylate, an amino resin, various synthetic rubber type thermoplastic resins and mixtures thereof.

The thermosetting resins or reactive type resins used in the present invention are those having a molecular weight of 200,000 or lower. When they are in the coating composition, the molecular weight thereof becomes infinite due to a condensation and addition reaction when they are coated and dried. Among those resins, the resins that do not soften nor melt until the resins are heat-decomposed are preferred. The specific examples thereof are phenol resins, epoxy resins, polyurethane hardenable resins, urea resins, melamine resins, alkyd resins, silicone resins, acryl type reactive resins, a mixture of high molecular weight polyester and isocyanate prepolymer, a mixture of a copolymer of methacrylate and diisocyanate prepolymer, a mixture of polyester polyol and polyisocyanate, urea formaldehyde resins, a mixture of low molecular weight glycol, high molecular weight diol and triphenylmethane triisocyanate, polyamine resins and mixtures thereof.

These binders are used alone or in combination and it is preferred an epoxy resin or urethane resin is contained in a ratio of 20 wt% or more in the binder.

Furthermore, non-magnetic particles such as alumina, titanium oxide, silica and the like can be added into the intermediate layer, if desired.

Upon providing an intermediate layer, the above-described binders, carbon black, ferromagnetic particles and other additives if desired are mixed and kneaded with a solvent and are coated on a support to prepare an intermediate layer.

The solvents used upon coating are ketones such as acetone, methyl ethyl ketone, methyl isobutyl ketone or cyclohexanone; alcohols such as methanol, ethanol, propanol or butanol, esters such as methyl acetate, ethyl acetate, butyl acetate, ethyl lactate, monoethyl ether of glycol acetate; glycol ethers such as ether, glycol dimethyl ether, glycol monoethyl ether or dioxane, tars (aromatic hydrocarbons) such as benzene, toluene or xylene; and chlorinate hydrocarbons such as methylene chloride, ethylene chloride, carbon tetrachloride, chloroform, ethylene chlorohydrin or dichlorobenzene.

The ferromagnetic particles used in the magnetic layer of the present invention include barium ferrite, ferromagnetic iron oxide, chromium dioxide and ferromagnetic alloy particles, and it is preferred that hexagonal plate shaped ferrite which is easily vertically orientated such as barium ferrite or modified barium ferrite is used Recently, an increase of recording density has been strongly desired in order to put a greater amount of information on a magnetic recording medium and to minimize the size of the magnetic recording medium.

Therefore, it is necessary to greatly reduce the maximum dimension of acicular magnetic particles compared to recording wavlengths or recording bit length to obtain a magnetic recording medium suitable for high density recording using conventional acicular magnetic particles. In the future, it will be necessary to further reduce the dimension of acicular magnetic particles to obtain a magnetic recording medium having a much higher recording density. However, due to heat disturbance and the surface properties, the magnetic characteristics decreases and complete orientation can not be conducted, whereby good electromagnetic properties such as S/N can not be obtained. In this connection it has been found that a magnetic recording medium using as ferromagnetic particles hexagonal crystalline plate-shaped ferrite having an axis of easy magnetization vertical to the plate which is magnetically orientated in the machine direction of the magnetic recording medium, is advantageous.

The binders used for forming the magnetic layer of the present invention are generally used thermoplastic resins, thermosetting resins and reactive type resins, which can be used alone or in combination.

The thermoplastic resins generally having an average molecular weight of from 10,000 to 200,000, a degree of polymerization of from about 200 to 2,000 can be used, such as a copolymer resin of vinyl chloride and vinyl acetate, a copolymer of vinyl chloride and vinylidene chloride, acryl resins, cellulose derivatives or various synthetic rubber type thermoplastic resins, urethane elastomer, polyvinyl fluoride, polyamide resins, polyvinyl butyrate, a copolymer of styrene and butadiene or polystyrene resins, which can be used alone or in combination.

The thermosetting resins or reactive type resins are those generally halving an average molecular weight of 200,000 or less when they are in the coating composition. The molecular weight thereof becomes nearly infinite due to a condensation reaction or addition reaction after coating. In this case, when these resins are heat hardenable reins, those which do not soften nor melt by heating for hardening are preferred. Specific examples thereof are phenol and formaldehyde novolac resin, phenol and formaldehyde resoll resin, phenol and furfural resin, xylene and formaldehyde resin, urea resins, melamine resins, dry oil modified alkyd resins, phenol resin modified alkyd resins, maleic acid resin modified alkyd resins, unsaturated polyester resins, a combination of epoxy resins and hardening agent, polyether moisture hardening resins having an isocyanate at the terminal, a polyisocyanate prepolymer, and a combination of a polyisocyanate prepolymer and a resin having an active hydrogen. These resin are used alone or in combination.

The binders are generally used in a ratio of from 10 to 100 parts by weight, preferably from 15 to 50 parts by weight based on 100 parts by weight of ferromagnetic particles.

Furthermore, additives such as an abrasive agent, a lubricating agent, carbon black and so on can be added to the magnetic layer of the present invention if desired.

The magnetic layer of the magnetic recording medium of the present invention can be prepared by mixing and kneading the above-described ferromagnetic particles such as ferromagnetic alloy particles, binders and other filling particles if desired together with a solvent to prepare a magnetic coating composition, coating the composition on the intermediate layer provided on a support, conducting magnetic orientation thereon and drying it.

The solvents used upon mixing and kneading can be those that are generally used for preparing a magnetic coating composition.

The method for mixing and kneading can be the method used for preparing a magnetic coating composition. The order of adding each ingredient is not critical.

Various techniques are known to prepare a magnetic coating composition and can be selected to prepare the magnetic recording medium of the present invention.

The above-described intermediate layer and the magnetic layer can be provided separately or can be provided simultaneously using the multi-layered coating techniques in the present invention.

A backing layer containing carbon black and an abrasive powdery agent can be provided to improve charge preventing effect and running stability in the magnetic recording medium of the present invention.

In accordance with the present invention, due to the carbon black and ferromagnetic particles in an intermediate layer, the dispersibility of carbon black is improved, the surface property of the intermediate layer is remarkably improved, and the electromagnetic characteristics such as the sensitivity and S/N as well as the charge preventing effect in the magnetic layer can be improved. That is, conventionally used carbon black used for charge preventing in an intermediate layer has poor dispersibility in a binder, deteriorates the surface property of the intermediate layer and also deteriorates the electromagnetic properties of the magnetic layer provided thereon. On the other hand, due to addition of the ferromagnetic particles in the intermediate layer in the present invention, the affinity of the binders to carbon black can be improved, thereby remarkably improving the dispersibility of the carbon black, whereby the above described effects can be obtained.

Furthermore, due to the presence of the ferromagnetic particles in the intermediate layer, the outputs of the magnetic layer can be increased. In this sense, it is preferred that the same type of ferromagnetic particles used in the intermediate layer is used in the magnetic layer.

The present invention will be illustrated in more detail by the following non-limiting Examples and Comparative Examples.

EXAMPLE 1

The coating compositions having the following formulations for an intermediate layer and a magnetic layer were prepared respectively and were coated on a polyethylene triacetate film having a dry thickness of from 1.0 to 1.5 μm and from 3.0 to 3.5 μm respectively. The magnetic layer was subjected to magnetic orientation, dried, subjected to calendering treatment and slit to a desired width to prepare a magnetic tape sample. When Ba-ferrite was used as the ferromagnetic particles, the magnetic for magnetic orientation were set so that vertical orientation was conducted.

| Formulation of the coating composition for the intermediate layer: | |
|---|---|
| Carbon black | 70 parts |
| (average particle size 80 mμ) | (by weight) |
| Ferromagnetic particles | shown hereinafter |
| (same as those of the magnetic layer) | |
| Nitrocellulose | 40 parts |
| Urethane resin | 60 parts |

| -continued | |
|---|---|
| Formulation of the coating composition for the intermediate layer: | |
| Polyisocyanate | 40 parts |
| Methyl ethyl ketone | 300 parts |

The above ingredients were mixed and dispersed by a sand grinder for 10 hours to prepared a coating composition for the intermediate layer. In this case, the amounts of ferromagnetic particles used therein were either 3.5 parts, 10.5 parts or 17.5 parts so as to prepare coating compositions $C_1$, $C_2$ and $C_3$, respectively.

| Formulation of the coating composition for the magnetic layer: | |
|---|---|
| Co substituted Ba-ferrite, (plate shaped particles of average particle size 0.1 μm plate shaped ratio 3.3, average thickness 0.03 μm, and a coercive force of 660 Oe) | 300 parts |
| Copolymer of vinyl chloride, vinyl acetate and maleic anhydride (degree of polymerization of 450) | 45 parts |
| Aluminum stearate | 10 parts |
| Lecithin | 3 parts |
| Chromium oxide ($Cr_2O_3$) | 5 parts |
| Methyl ethyl ketone | 300 parts |
| Toluene | 300 parts |

The above ingredients were mixed, and dispersed by a sand grinder to prepare a magnetic coating composition.

The samples thus obtained herein are identified as Sample 1 (using $C_1$ composition), Sample 2 (using $C_2$ composition) and Sample 3 (using $C_3$ composition).

COMPARATIVE EXAMPLE

The same procedures as in Example 1 were repeated to prepare Sample 4 for comparison except that ferromagnetic particles were not added in the intermediate layer.

EXAMPLE 2

The same procedures as in Example 1 were repeated to prepare Sample 5 except that instead of Ba-ferrite, Co-added $Fe_2O_3$ having an acicular ratio (longer axis/shorter axis) of about 13, an average length of long axis of 0.3 μm and coercive force of 660 Oe and 10.5 parts thereof was used for the intermediate layer and 300 parts thereof were used for the magnetic layer.

EXAMPLE 3

The same procedures as in Example 1 were repeated to prepare Sample 6 except that instead of Ba-ferrite, 10.5 parts of ferromagnetic alloy particles of Fe-Ni alloy (Ni 2 wt%), having an acicular ratio (long axis/short axis) of about 13, an average length of long axis of 0.3 μm and a coercive force of 1300 Oe were used for the intermediate layer and 300 parts thereof were used for the magnetic layer.

Then, the surface gloss, the surface electric resistivity, the outputs and S/N of the above sample was measured. The results are shown in the following Table.

Methods for Measuring the Above Prepare

1. Surface gloss

The surface gloss are measured at an angle of 45° using a cassette type digital gloss meter GK-45D manufactured by Suga Tesing Machine Ci., Ltd.

2. Surface electric resistance

The surface electric resistivity was measured using a digital super insulating resistometer TR-8611A manufactured by Takeda Riken Co., Ltd.

3. Outputs and S/N

The outputs and S/N at 6.8 MHz were measured using a remodelling B video deck V-500D equipped with a ferrite head, moving at a speed of 3.5 m/sec.

TABLE

| Sample No. | Surface gloss (dispersibility) | Surface electric resistivity ($\Omega/cm^2$) | output (dB) | S/N (dB) |
|---|---|---|---|---|
| 1 | 84 | $5 \times 10^4$ | 0.2 | 0 |
| 2 | 90 | $8 \times 10^5$ | +1.2 | +0.7 |
| 3 | 94 | $7.8 \times 10^7$ | +1.5 | +0.8 |
| 4 (Comparison) | 76 | $2 \times 10^4$ | 0 | 0 |
| 5 | 87 | $7 \times 10^5$ | +0.6 | +0.3 |
| 6 | 95 | $6 \times 10^5$ | +0.8 | +0.4 |

Note:
Outputs were measured at 6.8 MHz.

It is apparent from the above results that the surface property, outputs and S/N are also considerably improved by adding the ferromagnetic particles the intermediate layer. In addition, as the above results demonstrate, the surface electric resistivity values are adequate to maintain good a charge preventing effect While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
   a non-magnetic support having provided thereon an intermediate layer comprising carbon black, a binder and ferromagnetic particles present in a weight ratio of from 5% to 25% based on the carbon black, and wherein said carbon black is employed in an amount of from 70 to 200 wt% based on said binder; and
   a magnetic layer provided on said intermediate layer, wherein said magnetic layer comprises ferromagnetic particles and a binder.

2. The magnetic recording medium as claimed in claim 1, wherein the ferromagnetic particles contained in the magnetic layer are hexagonal crystalline plate-shaped ferrite.

3. The magnetic recording medium as claimed in claim 1, wherein said carbon black has an average particle size of from 20 m$\mu$ to 1000 m$\mu$.

4. The magnetic recording medium as claimed in claim 1, wherein said ferromagnetic particles in said intermediate layer are selected from the group consisting of $\gamma$-Fe$_2$O$_3$, Co-$\gamma$-Fe$_2$O$_3$, Fe-Co or Fe-Co-Ni alloy magnetic particles, CrO$_2$ and Ba-Fe.

5. The magnetic recording medium as claimed in claim 1, wherein the amount of ferromagnetic particles in said intermediate layer is from 10 to 20 wt% based on carbon black in said intermediate layer.

6. The magnetic recording medium as claimed in claim 1, wherein the intermediate layer has a thickness of 0.2 to 3.0 $\mu$m.

7. The magnetic recording medium as claimed in claim 1, wherein the intermediate layer has a thickness of 0.5 to 2.0 $\mu$m.

8. The magnetic recording medium as claimed in claim 1, wherein the ferromagnetic particles employed in the intermediate layer are the same type which are employed in the magnetic layer.

* * * * *